US009506560B2

(12) United States Patent
Tachibanada et al.

(10) Patent No.: US 9,506,560 B2
(45) Date of Patent: Nov. 29, 2016

(54) AUTOMATIC TRANSMISSION

(71) Applicant: HONDA MOTOR CO., LTD., Tokyo (JP)

(72) Inventors: Yuya Tachibanada, Wako (JP); Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 14/626,923

(22) Filed: Feb. 20, 2015

(65) Prior Publication Data

US 2015/0252893 A1     Sep. 10, 2015

(30) Foreign Application Priority Data

Mar. 10, 2014   (JP) ................... 2014-046703

(51) Int. Cl.
*F16H 61/12* (2010.01)
*F16H 61/686* (2006.01)
*F16H 61/16* (2006.01)
*F16H 59/46* (2006.01)
*F16H 59/38* (2006.01)

(52) U.S. Cl.
CPC ........... *F16H 61/12* (2013.01); *F16H 59/38* (2013.01); *F16H 59/46* (2013.01); *F16H 61/686* (2013.01); *F16H 2061/1208* (2013.01); *F16H 2061/1232* (2013.01); *F16H 2061/1276* (2013.01); *F16H 2061/168* (2013.01); *F16H 2200/0069* (2013.01); *F16H 2200/2012* (2013.01); *F16H 2200/2048* (2013.01); *F16H 2200/2082* (2013.01)

(58) Field of Classification Search
CPC ............ F16H 59/38; F16H 59/46; F16H 2059/6807; F16H 61/12; F16H 61/0204; F16H 61/0213; F16H 2061/1208; F16H 2061/1276; F16H 2061/168
See application file for complete search history.

(56) References Cited

U.S. PATENT DOCUMENTS

| | | | | |
|---|---|---|---|---|
| 4,955,258 A | * | 9/1990 | Ito | F16H 59/36 477/115 |
| 6,440,040 B1 | * | 8/2002 | Amano | F16H 61/12 477/906 |
| 7,513,850 B2 | * | 4/2009 | Yoneyama | F16H 61/12 477/125 |

(Continued)

FOREIGN PATENT DOCUMENTS

| | | |
|---|---|---|
| CN | 102165223 | 8/2011 |
| CN | 102803796 | 11/2012 |

(Continued)

OTHER PUBLICATIONS

Chinese Office Action for corresponding CN Application No. 201510102756.1, Aug. 18, 2016.

*Primary Examiner* — Justin Holmes
*Assistant Examiner* — David Morris
(74) *Attorney, Agent, or Firm* — Mori & Ward, LLP

(57) ABSTRACT

An automatic transmission includes engagement mechanisms whose engagement states among the engagement mechanisms are changeable to achieve each of shift stages of the automatic transmission, a detector, and a determination device. The detector is configured to detect the engagement states of the engagement mechanisms. The determination device is configured to determine that abnormality has occurred in a case where the engagement states detected by the detector do not match a predetermined engagement state.

17 Claims, 7 Drawing Sheets

(56) References Cited

U.S. PATENT DOCUMENTS

| | | | |
|---|---|---|---|
| 7,862,472 B2* | 1/2011 | Kawaguchi | F16H 61/12 475/281 |
| 8,214,118 B2* | 7/2012 | Murakami | F16H 61/12 701/51 |
| 8,762,015 B2* | 6/2014 | Takada | F16H 59/70 477/906 |
| 2011/0301803 A1* | 12/2011 | Shimizu | F16H 61/12 701/29.2 |
| 2012/0253618 A1* | 10/2012 | Takada | F16H 59/70 701/55 |

FOREIGN PATENT DOCUMENTS

| CN | 103299111 | 9/2013 |
|---|---|---|
| JP | 4607040 B2 | 10/2007 |

* cited by examiner

FIG. 2A

|  | C1 | C2 | C3 | B1 | B2 | B3 | B4 | GEAR RATIO |
|---|---|---|---|---|---|---|---|---|
| RVS |  |  | ○ |  | ○ |  | ○ | 4.008 |
| 1 ST |  |  |  | ○ | ○ |  |  | 5.233 |
| 2 ND |  | ○ |  | ○ | ○ |  |  | 3.367 |
| 3 RD |  |  | ○ | ○ | ○ |  |  | 2.298 |
| 4 TH |  | ○ | ○ | ○ |  |  |  | 1.705 |
| 5 TH | ○ | (○) | (○) | ○ |  |  |  | 1.363 |
| 6 TH | ○ | ○ | ○ |  |  |  |  | 1.000 |
| 7 TH | ○ |  | ○ |  | ○ |  |  | 0.786 |
| 8 TH | ○ | ○ |  |  | ○ |  |  | 0.657 |
| 9 TH | ○ |  |  |  | ○ | ○ |  | 0.584 |
| 10 TH | ○ | ○ |  |  |  | ○ |  | 0.520 |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

AUTOMATIC TRANSMISSION

CROSS-REFERENCE TO RELATED APPLICATIONS

The present application claims priority under 35 U.S.C. §119 to Japanese Patent Application No. 2014-046703, filed Mar. 10, 2014, entitled "Automatic Transmission." The contents of this application are incorporated herein by reference in their entirety.

BACKGROUND

1. Field

The present disclosure relates to an automatic transmission.

2. Description of the Related Art

For example, a known configuration of an automatic transmission includes engagement mechanisms such as a planetary gear mechanism, a clutch, and a brake, and each of shift stages is achieved by switching between power transmission paths by the engagement mechanisms. In the case where abnormality occurs in an engagement or release operation in the engagement mechanisms, switching from one shift stage to another is not properly made. Thus, techniques to detect abnormality in an automatic transmission have been proposed (for example, see Japanese Patent No. 4607040).

SUMMARY

According to one aspect of the present invention, an automatic transmission that achieves each of a plurality of shift stages by a combination of engagement and release of a plurality of engagement mechanisms includes a detection unit and a determination unit. The detection unit detects an operating state of the engagement mechanisms. The determination unit determines whether or not abnormality has occurred, based on a result of detection performed by the detection unit. The determination unit determines that abnormality has occurred in the case where an operating state of the engagement mechanisms does not match a predetermined operating state.

According to another aspect of the present invention, an automatic transmission includes engagement mechanisms whose engagement states among the engagement mechanisms are changeable to achieve each of shift stages of the automatic transmission, a detector, and a determination device. The detector is configured to detect the engagement states of the engagement mechanisms. The determination device is configured to determine that abnormality has occurred in a case where the engagement states detected by the detector do not match a predetermined engagement state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2A is a diagram illustrating an example engagement table of engagement mechanisms, and FIG. 2B is a diagram illustrating gear ratios of planetary gear mechanisms.

DESCRIPTION OF THE EMBODIMENTS

Figure 1:
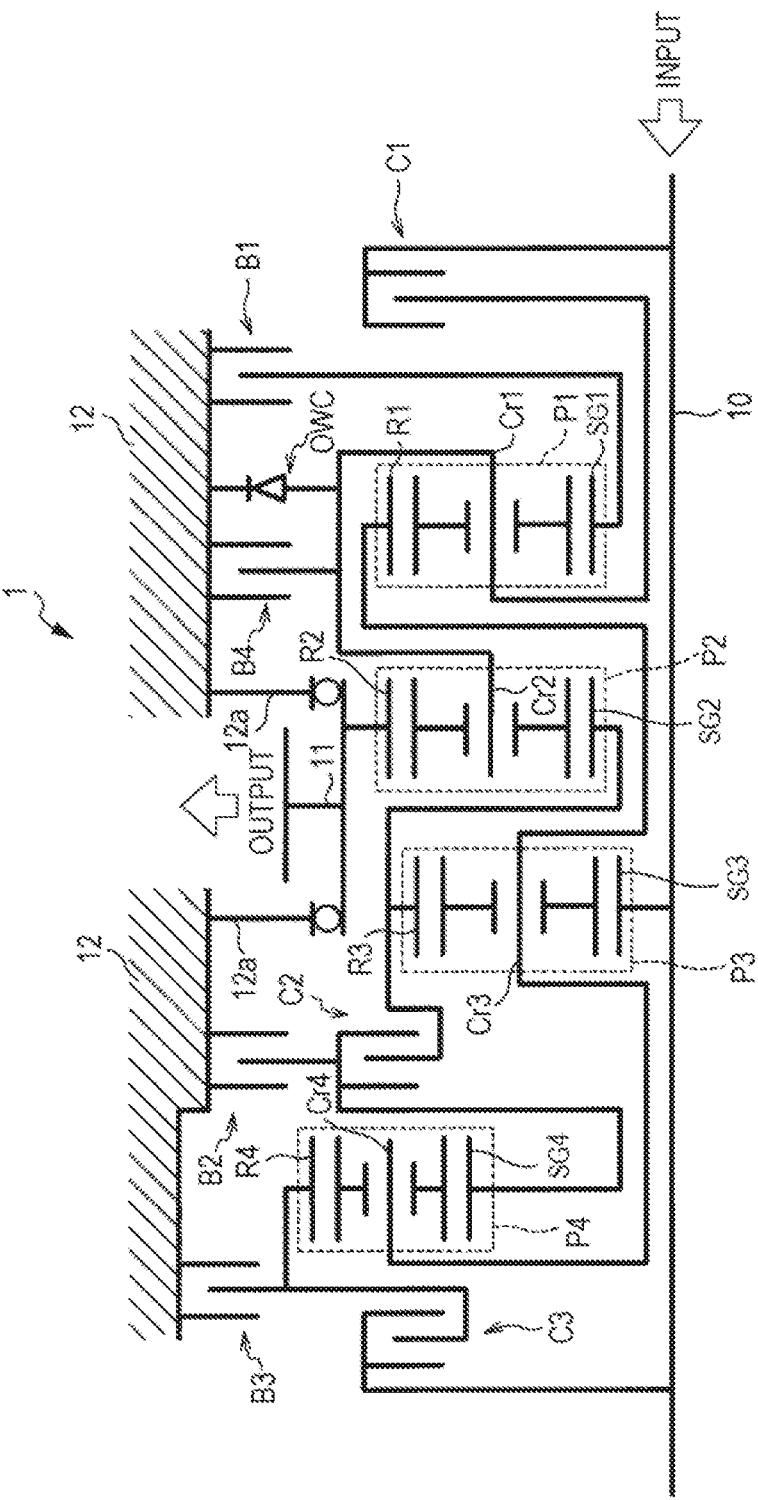
FIG. 1 is a skeleton diagram of an automatic transmission according to an embodiment of the present disclosure.

The embodiments will now be described with reference to the accompanying drawings, wherein like reference numerals designate corresponding or identical elements throughout the various drawings.

FIG. 1 is a skeleton diagram of an automatic transmission 1 according to an embodiment of the present disclosure. Referring to FIG. 1, the automatic transmission 1 includes an input shaft 10 and an output member 11, the input shaft 10 being rotatably pivotally supported in a casing 12 that forms a transmission case for the automatic transmission 1, the output member 11 being rotatably supported coaxially with the input shaft 10 by a support member 12a supported by the casing 12.

The input shaft 10 receives an input of force from a driving source (not illustrated) such as an internal-combustion engine or an electric motor, and rotates by the force. It is possible to provide a starting device between the input shaft 10 and the driving source. Providing a starting device may reduce transmission shock. The starting device may be a clutch-type starting device (such as a single-plate type clutch or multi-plate type clutch) or a fluid coupling type starting device (such as a torque converter).

The output member 11 includes an output gear concentric with the input shaft 10. Rotation of the input shaft 10 is changed in speed by the below-described transmission mechanism and transmitted to the output member 11. The rotation of the output member 11 is transmitted to driving wheels via, for example, a counter shaft and a differential gear device which are not illustrated.

As transmission mechanisms, the automatic transmission 1 includes planetary gear mechanisms P1 to P4, engagement mechanisms C1 to C3, B1 to B4, and an one-way clutch OWC. In the case of the present embodiment, the planetary gear mechanisms P1 to P4 are each a single pinion type planetary gear mechanism.

There are provided 12 rotational elements in total. As rotational elements, the planetary gear mechanisms P1 to P4 include sun gears SG1 to SG4, ring gears R1 to R4, and carriers Cr1 to Cr4 that support pinion gears that are provided coaxially with the input shaft 10.

The engagement mechanisms C1 to C3, B1 to B4 releasably connect between predetermined rotational elements of the planetary gear mechanisms P1 to P4, between the input shaft 10 and predetermined rotational elements, or between predetermined rotational elements and the casing 12. In the case of the present embodiment, the engagement mechanisms C1 to C3 are clutches, and the engagement mechanisms B1 to B4 are brakes. A power transmission path from the input shaft 10 to the output member 11 is switched by a combination of engagement (connection) and release (disconnection) of the engagement mechanisms C1 to C3, and B1 to B4, and thus a plurality of shift stages is achieved.

In the case of the present embodiment, each of the engagement mechanisms C1 to C3, and B1 to B4 is assumed to be a hydraulic frictional engagement mechanism. The hydraulic frictional engagement mechanism includes a dry or wet single-plate type clutch and a dry or wet multi-plate type clutch.

Next, connection relationship between the components will be described with reference to FIG. 1.

The sun gear SG3 of the planetary gear mechanism P3 is connected to the input shaft 10. The ring gear R3 is connected to the sun gear SG2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11.

The clutch C1 connects or disconnects the input shaft 10 and the carrier Cr1 (and the carrier Cr2 connected to the carrier Cr1) of the planetary gear mechanism P1. The clutch C2 connects or disconnects the ring gear R3 of the planetary gear mechanism P3 and the sun gear SG4 of the planetary gear mechanism P4. The clutch C3 connects or disconnects the input shaft 10 and the ring gear R4 of the planetary gear mechanism P4.

The brake B1 connects or disconnects the casing 12 and the sun gear SG1 of the planetary gear mechanism P1. The brake B2 connects or disconnects the casing 12 and the sun gear SG4 of the planetary gear mechanism P4. The brake B3 connects or disconnects the casing 12 and the ring gear R4 of the planetary gear mechanism P4.

The brake B4 connects or disconnects the casing 12 and the carrier Cr2 (and the carrier Cr1 connected to the carrier Cr2) of the planetary gear mechanism P2.

The one-way clutch OWC is provided between predetermined rotational elements (the carriers Cr1, Cr2 herein) and the casing 12 to allow the predetermined rotational elements to rotate in a predetermined direction (forward direction herein) and to regulate the predetermined rotational elements to rotate in an opposite direction (reverse direction herein).

Next, FIG. 2A illustrates an engagement table (connection table) for the engagement mechanisms included in the automatic transmission 1, and FIG. 2B illustrates the gear ratio of each planetary gear mechanism included in the automatic transmission 1.

In the example of the engagement table of FIG. 2A, "○" indicates engaged state (state in which corresponding components are connected) and no mark indicates released state. Two "(○)" in 5th gear stage indicates either one is selectively set in engaged state according to driving conditions. The 5th gear stage is achieved by setting the clutch C1 and the brake B1 in engaged state and further setting one of the clutch C2 and the clutch C3 in engaged state. "GEAR RATIO" indicates possible gear ratios between the input shaft 10 and the output member 11.

In the automatic transmission 1, forward 10th gear stage and reverse 1st gear stage (RVS) are each achieved by setting two (1st gear stage) or three (other than the 1st gear stage) of the engagement mechanisms C1 to C3, B1 to B4 in engaged state in each shift stage.

Control Device

Figure 3:
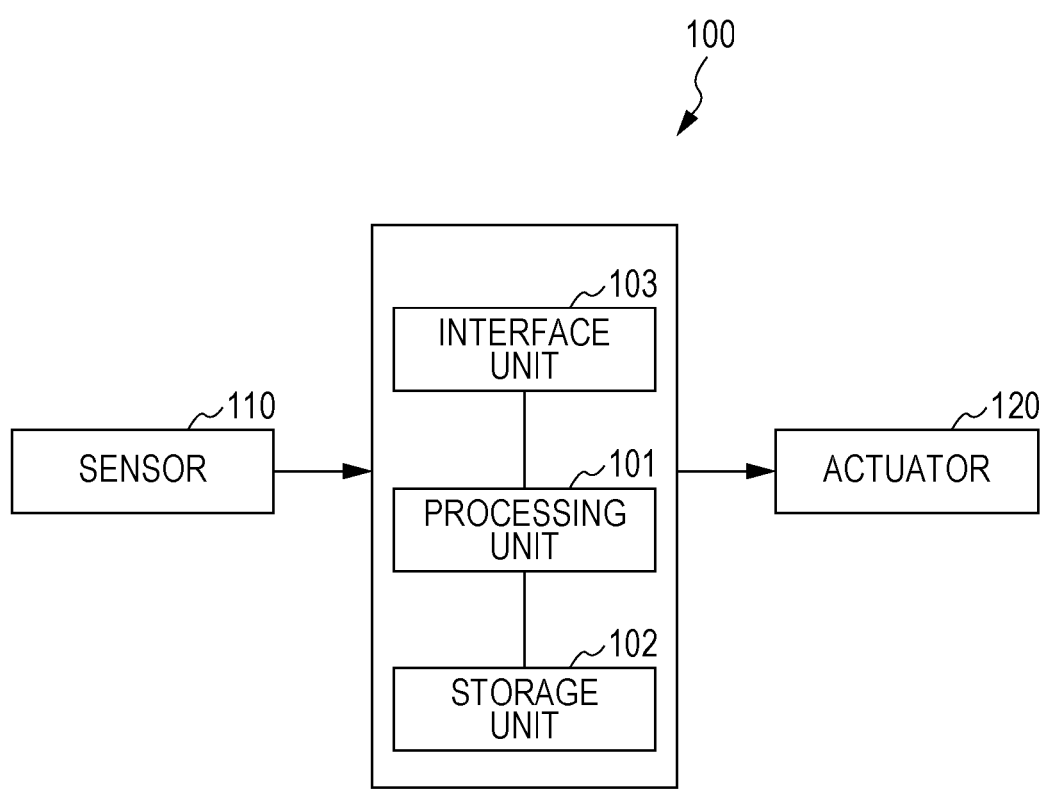
FIG. 3 is a block diagram illustrating an example control device for the automatic transmission of FIG. 1.

FIG. 3 is a block diagram of a control device 100 for the automatic transmission 1. The control device 100 is capable of controlling not only the automatic transmission 1 but also its driving source and a starting device between the automatic transmission 1 and the driving source. The control device 100 includes a processing unit 101 such as a CPU, a storage unit 102 such as a RAM or a ROM, and an interface unit 103 that interfaces the processing unit 101 with an external device.

The processing unit 101 executes programs stored in the storage unit 102, and controls various actuators 120 based on the results of detection performed by various sensors 110.

The various sensors 110 include the various sensors provided in the automatic transmission 1 and its driving source. In the relationship with the below-described example of control, the various sensors 110 include, for example, hydraulic pressure sensors SR1 to SR3 and SR11 to SR14.

The various actuators 120 include the various actuators provided in the automatic transmission 1 and the driving source. In the relationship with the below-described example of control, the actuators 120 include electromagnetic valves LS1 to LS3 and LS11 to LS14 such as linear solenoids that switch between the operating states of the engagement mechanisms C1 to C3, B1 to B4.

Hydraulic System

Figure 4:
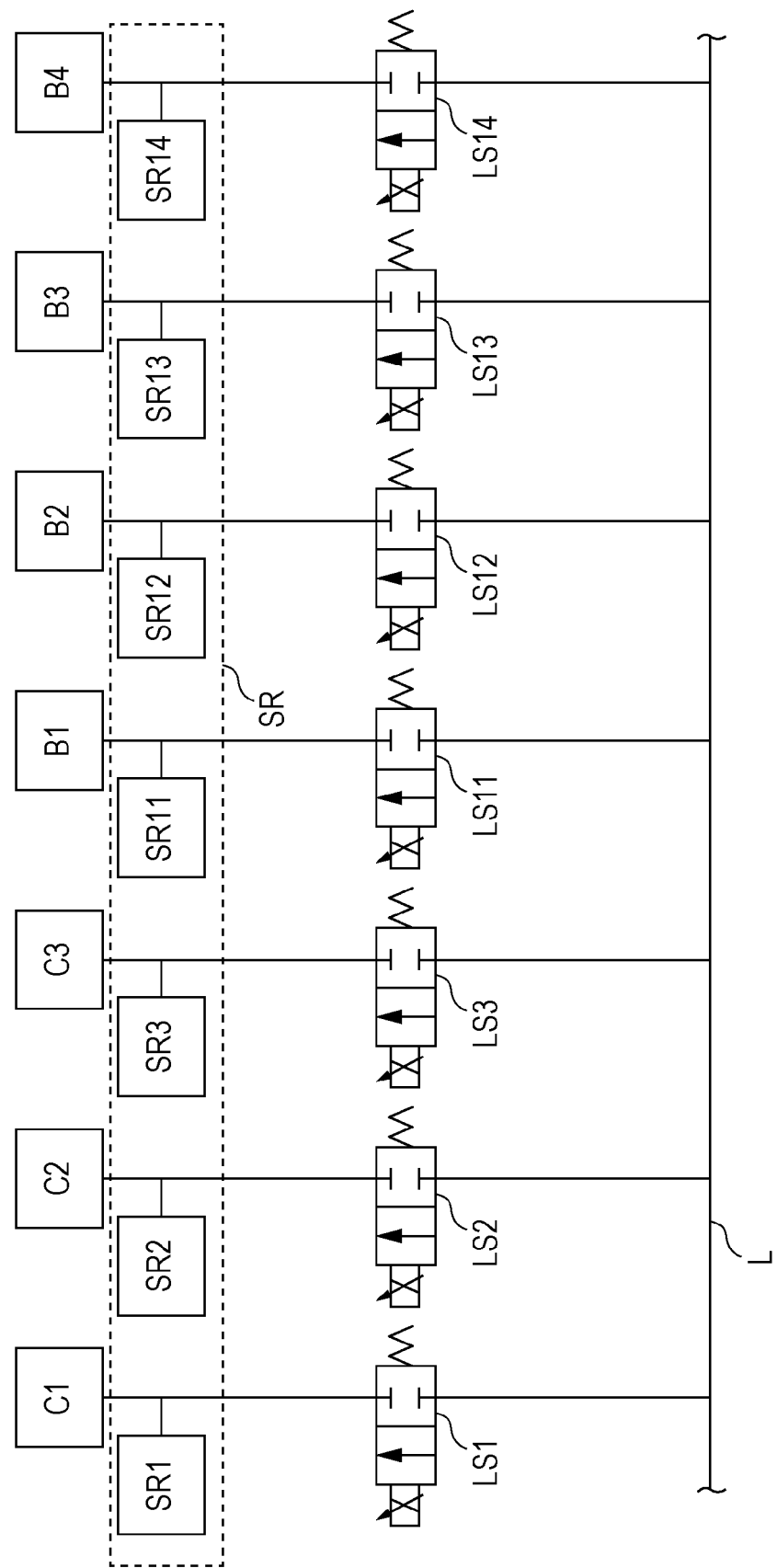
FIG. 4 is a circuit diagram of a hydraulic system.

FIG. 4 is a circuit diagram illustrating part of a hydraulic system included in the automatic transmission 1, and specifically illustrating a hydraulic circuit around the engagement mechanisms C1 to C3, B1 to B4. Each of the engagement mechanisms C1 to C3, B1 to B4 is assigned a corresponding one of the electromagnetic valves LS1 to LS3 and LS11 to LS14, the corresponding one electromagnetic valve supplying hydraulic fluid to the engagement mechanism. Engagement and release of each of the engagement mechanisms C1 to C3, B1 to B4 may be switched by releasing or cutting off a supply line L for hydraulic fluid with the electromagnetic valves LS1 to LS3 and LS11 to LS14.

A detection device SR detects an operating state of a plurality of engagement mechanisms C1 to C3, B1 to B4. In the case of the present embodiment, the detection device SR includes pressure sensors SR1 to SR3, SR11 to SR14 that are provided in the engagement mechanisms C1 to C3, B1 to B4, respectively. Each of the pressure sensors SR1 to SR3, SR11 to SR14 receives a supply of hydraulic fluid which is to be supplied to corresponding one of the engagement mechanisms C1 to C3, B1 to B4. In the case where the pressure of hydraulic fluid detected by a pressure sensor reaches a predetermined value, it is determined that a corresponding engagement mechanism is engaged, and in the case where the pressure is lower than the predetermined value, it is determined that the corresponding engagement mechanism is released. The former case may be referred to as "where a pressure sensor is ON" and the latter case may be referred to as "where a pressure sensor is OFF". In the present embodiment, it is assumed that an intermediate pressure between ON and OFF is also detectable by each pressure sensor.

In the case of the present embodiment, each engagement mechanism is provided with one pressure sensor. However, a plurality of engagement mechanisms may use one pressure sensor in common. In this case, for example, switching valve that switches between engagement mechanisms for detection may be provided. Depending on the engagement relationship between the gear stages and the engagement mechanisms, a plurality of engagement mechanisms may share and use one pressure sensor without having such a switching valve.

Determination of Abnormality Occurrence

In the case where a failure occurs in the electromagnetic valves LS1 to LS3, LS11 to LS14, or a failure occurs in the engagement mechanisms C1 to C3, B1 to B4 themselves, it is difficult to achieve a target operating state for control in engagement and release of the engagement mechanisms C1 to C3, B1 to B4, and thus a target shift stage may not be achieved. Also, interlocking may occur.

A technique of detecting an occurrence of such abnormality includes, for example, calculating a gear ratio between input and output, and determining whether or not the gear ratio is in accordance with a shift stage for control. However, in this case, various state variables are utilized which have been calculated according to normal transmission control of automatic transmission, and thus implemented abnormality detection system depends on the reliability of the state variables.

In the present embodiment, occurrence of abnormality is determined based on the result of detection performed by the detection device SR, and predetermined information. In this manner, Accordingly, the independence of abnormality detection may be improved and the reliability of determination of occurrence of abnormality may be improved.

In normal conditions, the result of detection performed by the detection device SR is as listed in the engagement table illustrated in FIG. 2A. In FIG. 2A, when an engagement mechanism is in engaged state indicated by "O", a corresponding pressure sensor is "ON". Conversely, when an engagement mechanism is in released state, a corresponding pressure sensor is "OFF". For example, when 10th gear stage is selected, the pressure sensors SR1, SR2, and SR13 are supposed to be "ON" and other pressure sensors are supposed to be "OFF".

Therefore, in the case where the operating state of the engagement mechanisms C1 to C3, B1 to B4 does not match the corresponding a predetermined operating state indicated in the engagement table of FIG. 2A, it may be determined that abnormality has occurred.

Hereinafter, a specific example of determination will be described. In the present embodiment, the control device 100, which manages the control of the automatic transmission 1, performs abnormality determination processing. However, hardware for abnormality determination processing may be provided separately from the control device 100, and thereby the independence of abnormality detection may be further improved in some cases.

First Example of Determination

As described already, in the case of the present embodiment, forward 10th gear stage and reverse 1st gear stage (RVS) are each achieved by setting two (1st gear stage) or three (other than the 1st gear stage) of the engagement mechanisms C1 to C3, B1 to B4 in engaged state in each shift stage. That is, the number of engagement mechanisms that are in engaged state (or released state) is a predetermined number. Then, in the case where the number of engagement mechanisms that are in engaged state (or released state) does not match the predetermined number, it may be determined that abnormality has occurred.

Figure 5A:
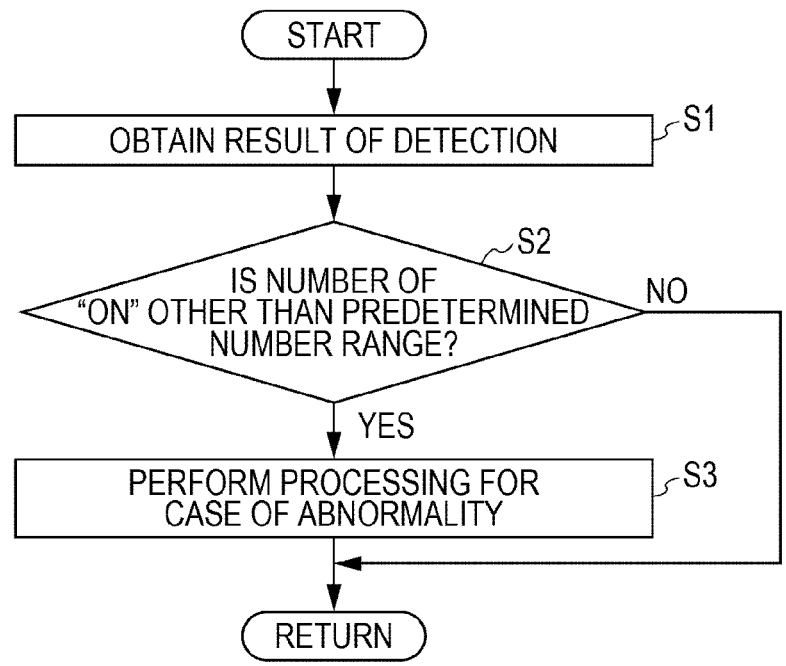
FIG. 5A is a flow chart illustrating example abnormality determination processing.

FIG. 5A is a flow chart illustrating example abnormality determination processing performed by the control device 100. In the present embodiment, occurrence of abnormality is determined based on the number of engagement mechanisms that are in engaged state.

In S1, detection results from the pressure sensors SR1 to SR3, SR11 to SR14 are obtained. The detection results are saved in a predetermined storage area in the storage unit 102. The storage area may be an area for exclusive use of storing the detection result from each pressure sensor for abnormality determination. In this manner, the independence of abnormality detection may be assured in respect of storage area. The detection result obtained in the past several to several tens of detection may be saved.

In S2, it is determined whether or not the number of "ON" states of the pressure sensors SR1 to SR3, SR11 to SR14, that is, the number of the engagement mechanisms in engaged state is out of a predetermined number range. When negative determination is made, a unit of processing is exited, and when positive determination is made, occurrence of abnormality is determined, and the flow proceeds to S3.

In the case of the present embodiment, no shift stage is provided in which the number of the engagement mechanisms in engaged state is 4 or greater. Therefore, for example when the number of "ON" states is 4 or greater in S2, the number may be determined to be out of the predetermined number range. In the first example, only the number of "ON" states of the pressure sensors does matter, and so information on the relationship between each pressure sensor and each engagement mechanism is unnecessary.

In S3, processing for occurrence of abnormality is performed. Here, for example, processing is performed such that the driving force inputted to the input shaft 10 is not transmitted to each axle via the output member 11. For example, the shift stage may be set in neutral (release of all the engagement mechanisms). This may avoid abnormal running and sudden stop of the vehicle. The processing for occurrence of abnormality also includes, for example, informing a driver of abnormality occurrence via sound or display. At this point, the unit of processing is exited.

Figure 5B:
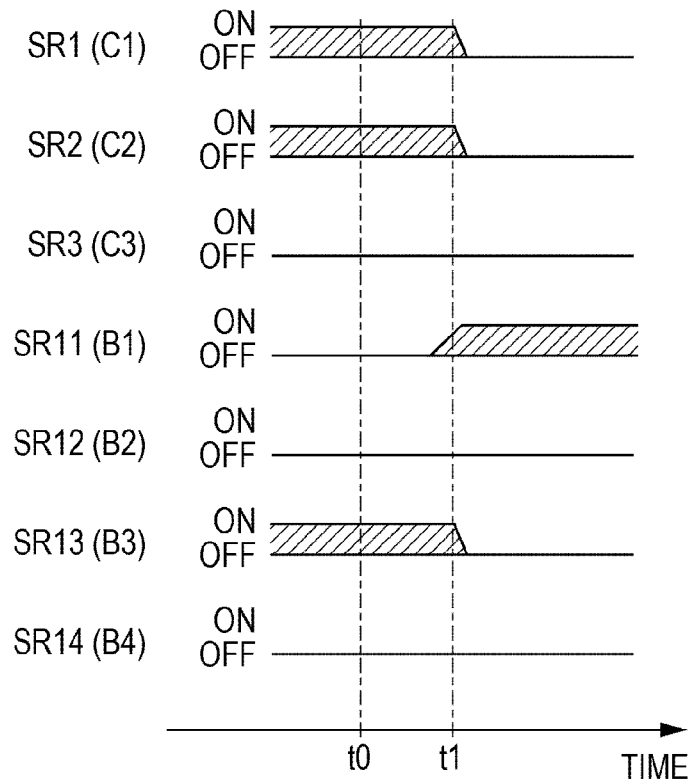
FIG. 5B is a timing chart illustrating an example of change in sensor signals.

FIG. 5B is a timing chart illustrating an example of change in the sensor signals (detection result) of the pressure sensors SR1 to SR3, SR11 to SR14. The symbol of each pressure sensor is followed parentheses in which the symbol of a corresponding engagement mechanism is indicated. The example of FIG. 5B assumes that abnormality occurs while 10th gear stage is being achieved.

At time t0, it is detected that the pressure sensors SR1, SR2, SR13 are in "ON" state, and the engagement mechanisms C1, C2, B3 are in engaged state. This indicates an normal operating state of 10th gear stage as illustrated in the engagement table of FIG. 2A.

At time t1, a rising edge of the pressure sensor SR11 is detected. This indicates that the engagement mechanism B1 has switched to engaged state, and it is determined that abnormality has occurred in which four engagement mechanisms are in engaged state simultaneously, and this is not found in the engagement table of FIG. 2A.

The processing for occurrence of abnormality is performed such that the shift stage is set in neutral. As a result, the engagement mechanisms C1, C2, B3 change to released state, and the pressure sensors SR1, SR2, SR13 change to "OFF" state. A case is assumed in which although the engagement mechanism B1 attempts to perform release control, the engagement mechanism B1 remains in engaged state due to abnormality.

In the example of FIG. 5B, whether or not abnormality has occurred is determined in response to a change in the detection result from one of the sensors. In this manner, determination is made in response to rising or falling of a sensor signal, and thus it is possible to determine occurrence of abnormality before an improper combination of engagement and release of the engagement mechanisms is made, and the processing for occurrence of abnormality may be quickly performed to cope with the occurrence of abnormality. In the example of FIG. 5B, before or immediately after four engagement mechanisms are set in engaged state simultaneously, engagement of the engagement mechanisms C1, C2, B3 is released.

As a threshold to determine a rising edge of a sensor signal, a threshold value may be set, for example, in a range of 50 to 70% of the gap between ON and OFF, and as a threshold to determine a falling edge of a sensor signal, a threshold value may be set, for example, in a range of 30 to 50% of the gap between ON and OFF.

Second Example of Determination

Also, in the second example, in the case where the number of engagement mechanisms that are in engaged state (or released state) does not match the predetermined number, it may be determined that abnormality has occurred. As described already, in the case of the present embodiment, the number of the engagement mechanisms in engaged state is 2 or 3 in each shift stage. The number of the engagement mechanisms in engaged state is 0 in neutral and parking range. Therefore, the number of the engagement mechanisms in engaged state is one of 0, 2, and 3, and a number other than these basically indicates occurrence of abnormality. This determination may be made in normal time when a shift stage is achieved. However, at the transition time of switching a shift stage, the number of the engagement mechanisms in engaged state may be other than 0, 2, and 3 (for example, 1, 4, 5) temporarily. Thus, both the normal time and the transition time are taken into consideration.

Figure 6A:
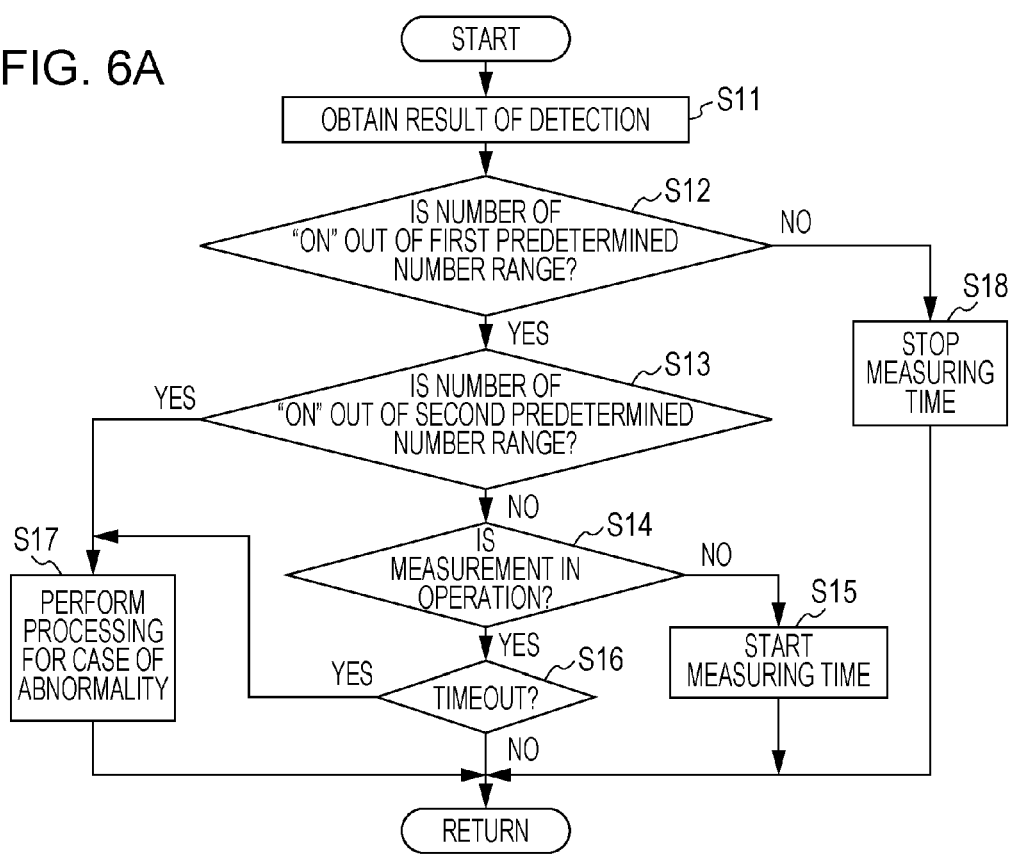
FIG. 6A is a flow chart illustrating another example abnormality determination processing.

FIG. 6A is a flow chart illustrating example abnormality determination processing in the second example. In S11, detection results from the pressure sensors SR1 to SR3, SR11 to SR14 are obtained. This is the same processing as in S1 described above.

In S12, it is determined whether or not the number of "ON" states of the pressure sensors SR1 to SR3, SR11 to SR14, that is, the number of the engagement mechanisms in engaged state is out of a first predetermined number range. When negative determination is made, the number is determined to be normal and the flow proceeds to S18, and when positive determination is made, occurrence of abnormality or transition of shift stage is determined and the flow proceeds to S13. The first predetermined number range may be set based on the operating state at the normal time of each shift stage, and may consist of, for example, 0, 2, and 3. When the number of the pressure sensors in "ON" is one of 0, 2 and 3, the number is determined to be normal, and the flow proceeds to S18.

In S13, it is determined whether or not the number of "ON" states of the pressure sensors SR1 to SR3, SR11 to SR14, that is, the number of the engagement mechanisms in engaged state is out of a second predetermined number range. When positive determination is made, occurrence of abnormality is determined and the flow proceeds to S17, and when negative determination is made, occurrence of abnormality or transition of shift stage is determined and the flow proceeds to S14. The second predetermined number range may be set based on the operating state at the transition time of each shift stage, and may consist of, for example, 1, 4, and 5. When the number of the pressure sensors in "ON" is one of 1, 4 and 5, the current timing may be a transition time of shift stage, and the flow proceeds to S14.

In S14, it is determined whether or not the time measurement started in S15 is in the middle of its operation. When positive determination is made, the flow proceeds to S16, and when negative determination is made, the flow proceeds to S15. In S15, measurement of time (PT time period described later) is started for determining the end of the transition time of shift stage, and subsequently, the unit of processing is exited. In S16, it is determined whether or not the time measurement started in S15 has timed out. When positive determination is made, the flow proceeds to S17, and when negative determination is made, the unit of processing is exited.

In S17, the processing for occurrence of abnormality is performed. It is the same processing as in S3 described above. In S18, the time measurement started in S15 is terminated and the value of the measurement is cleared. At this point, the unit of processing is exited.

Figure 6B:
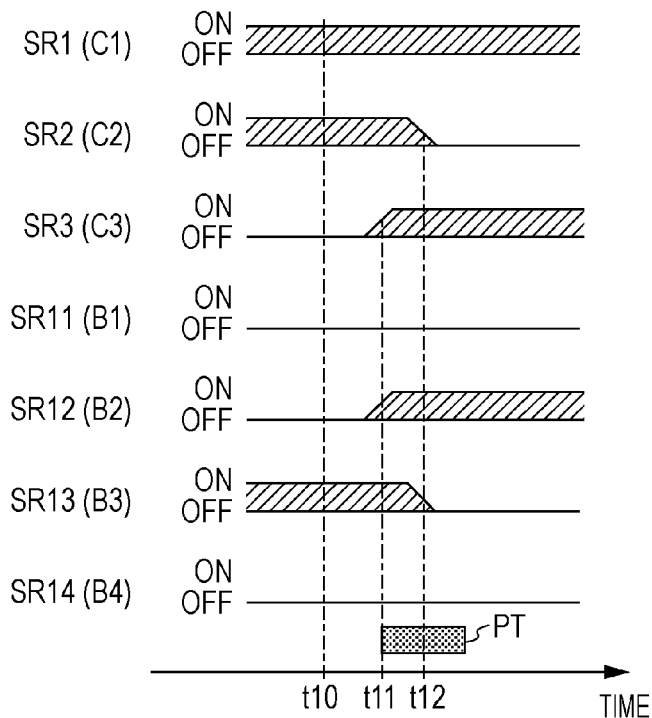
FIG. 6B is a timing chart illustrating another example of change in sensor signals.

Thus, in the case of the second example, when the number of "ON" states of the pressure sensors is out of the first predetermined number range, the processing for occurrence of abnormality is not immediately performed in consideration of possibility of a transition time of shift stage, and subsequently, when the number falls within the first predetermined number range, the current state is treated as normal, or otherwise when the state other than the first predetermined number range remains after a lapse of a certain time, the processing for occurrence of abnormality is performed. FIG. 6B is a timing chart illustrating an example of change in the sensor signals (detection result) of the pressure sensors SR1 to SR3, SR11 to SR14, and illustrates an example of determination at a transition time of shift stage.

At time t10, it is detected that the pressure sensors SR1, SR2, SR13 are in "ON" state, and the engagement mechanisms C1, C2, B3 are in engaged state. This indicates an normal operating state of 10th gear stage as illustrated in the engagement table of FIG. 2A.

At time t11, rising edges of the pressure sensor SR3, SR12 are detected. This indicates that the engagement mechanisms C3, B2 have switched to engaged state, and five engagement mechanisms are in engaged state, and this is not found in the engagement table of FIG. 2A. However, this may be the case of transition to another shift stage, and thus time measurement of a permission time PT is started, the permission time PT being set in consideration of a transition time of shift stage. The permission time PT may be, for example, a time equivalent to a presumed maximum time of a transition time of shift stage or the presumed maximum time plus a margin.

At time t12, falling edges of the pressure sensor SR2, SR13 are detected. This indicates that the engagement mechanisms C2, B3 have switched to released state, and three engagement mechanisms have switched to the operating state in engaged state. This is the 7th gear stage in the engagement table of FIG. 2A. Since it is verified that three engagement mechanisms are in engaged state before the end of the permission time PT, the current state is determined to be normal. In this manner, in the second example, occurrence of abnormality may be determined in consideration of a transition time of shift stage. Also, in the case of the second example, only the number of "ON" states of the pressure sensors does matter, and so information on the relationship between each pressure sensor and each engagement mechanism is unnecessary.

Third Example of Determination

In this example, in the case where the combination of the engagement mechanisms in engaged state and the engagement mechanisms in released state does not match a predetermined combination, it is determined that abnormality has occurred. In other words, in the case where the detection result from the detection device SR is inconsistent with the engagement table of FIG. 2A, it is determined that abnormality has occurred. Thus, more accurate determination may be made than with the first example of determination and the second example of determination. In the third example, similarly to the second example of determination, determination is made in consideration of a transition time of shift stage. However, similarly to the first example of determination, a method may be adopted in which a transition time is not taken into consideration.

Figure 7A:
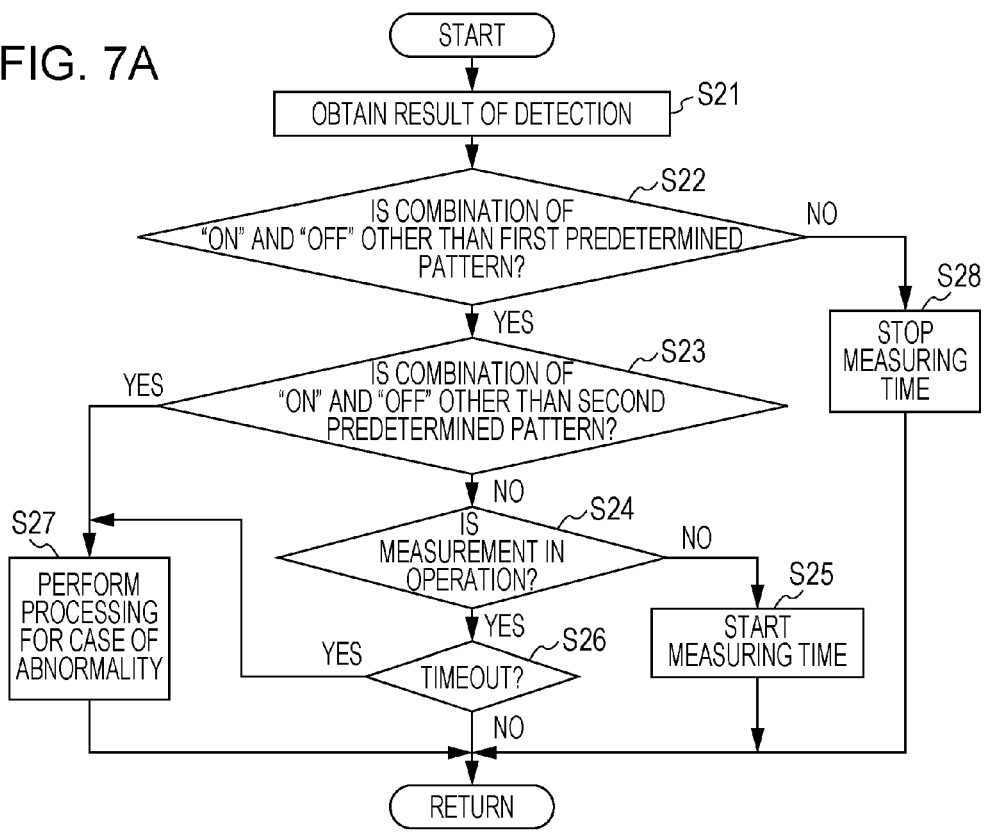
FIG. 7A is a flow chart illustrating another example abnormality determination processing.
Figure 7B:
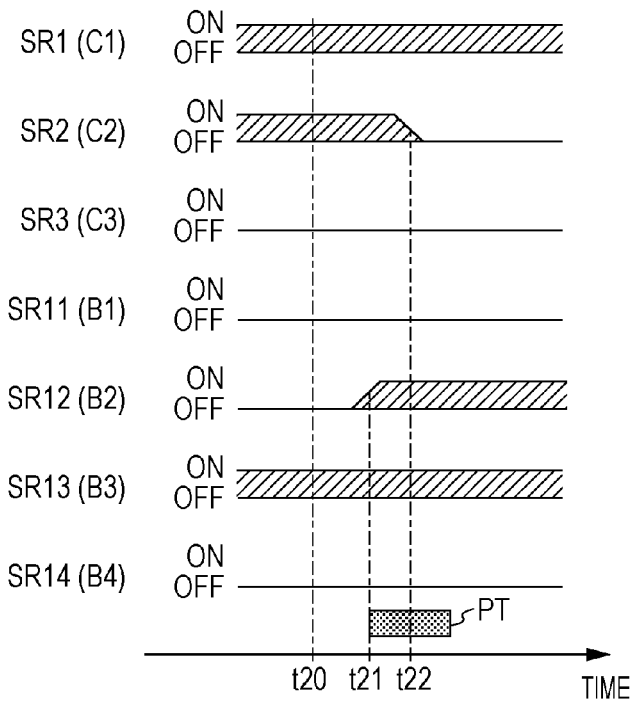
FIG. 7B is a timing chart illustrating another example of change in sensor signals.

FIG. 7A is a flow chart illustrating an example abnormality determination processing in the third example. The basic details are the same as the those of the processing of the second example of determination illustrated in FIG. 6A.

In S21, detection results from the pressure sensors SR1 to SR3, SR11 to SR14 are obtained. This is the same processing as in S1 described above.

In S22, it is determined whether or not the combination of "ON" and "OFF" states of the pressure sensors SR1 to SR3, SR11 to SR14 is out of a first predetermined pattern. When the combination is within the first predetermined pattern, the combination is determined to be normal and the flow proceeds to S28, and when the combination is out of the first predetermined pattern, occurrence of abnormality or transition of shift stage is determined and the flow proceeds to S23. The first predetermined pattern may be set based on the operating state at the transition time of each shift stage, and is, for example, the pattern obtained by replacing the content of the engagement table of FIG. 2A with ON-OFF pattern of the pressure sensors.

In S23, it is determined whether or not the combination of "ON" and "OFF" states of the pressure sensors SR1 to SR3, SR11 to SR14 is out of a second predetermined pattern. When the combination is out of the second predetermined pattern, occurrence of abnormality is determined and the flow proceeds to S27, and when the combination is within the second predetermined pattern, occurrence of abnormality or transition of shift stage is determined and the flow proceeds to S24.

The second predetermined pattern may be set based on the operating state at the transition time of each shift stage, and is, for example, the pattern obtained by replacing pattern of engagement and release of each engagement mechanism with ON-OFF pattern of the pressure sensors, the pattern of engagement and release being achieved when shift is made from a shift stage to another shift stage.

In S24, it is determined whether or not the time measurement of the permission time PT is in the middle of its operation, the permission time PT being described in the second example of determination. When positive determination is made, the flow proceeds to S26, and when negative determination is made, the flow proceeds to S25. In S25, measurement of permission time PT is started, and subsequently, the unit of processing is exited. In S26, it is determined whether or not the permission time PT has timed out. When positive determination is made, the flow proceeds to S27, and when negative determination is made, the unit of processing is exited.

In S27, the processing for occurrence of abnormality is performed. This is the same processing as in S3 described above. In S28, measurement of the permission time PT is terminated and the value of the measurement is cleared. At this point, the unit of processing is exited.

In the case of the third example, occurrence of abnormality is determined based the combination of "ON" and "OFF" states of the pressure sensors SR1 to SR3, SR11 to SR14, and thus information on the relationship between each pressure sensor and each engagement mechanism has to be provided. However, more accurate determination may be made accordingly.

For example, a case is assumed in which 10th gear stage allows gear shift to 9th gear stage only. According to the engagement table of FIG. 2A, when shift is made from 10th gear stage to 9th gear stage, the engagement mechanism B2 is switched from released state to engaged state, and the engagement mechanism C2 is switched from engaged state to released state. The engagement mechanisms C1, B3 remain to be in engaged state. Therefore, for example, when the engagement mechanism C1 or the engagement mechanism B3 is released, it may be determined that abnormality has occurred. For example, when one of the engagement mechanisms C3, B1, B4 is engaged, it may be determined that abnormality has occurred.

FIG. 7A is a timing chart illustrating an example of change in the sensor signals (detection result) of the pressure sensors SR1 to SR3, SR11 to SR14, and illustrates an example of determination at a transition time of shift stage.

At time t20, it is detected that the pressure sensors SR1, SR2, SR13 are in "ON" state, and the engagement mechanisms C1, C2, B3 are in engaged state. This indicates an normal operating state of 10th gear stage as illustrated in the engagement table of FIG. 2A.

At time t21, a rising edge of the pressure sensor SR12 is detected. This indicates that the engagement mechanisms B2 has switched to engaged state, and this pattern is not found in the engagement table of FIG. 2A. However, this may be the case of transition to another shift stage, and thus time measurement of the permission time PT is started.

At time t22, a falling edge of the pressure sensor SR2 is detected. This indicates that the engagement mechanisms C2 has switched to released state, and 9th gear stage is attempted to be achieved according to the engagement table of FIG. 2A. Since it is verified that a combination illustrated in the engagement table of FIG. 2A is achieved before the end of the permission time PT, the current state is determined to be normal. In this manner, in the second example, occurrence of abnormality may be determined in consideration of a transition time of shift stage.

Other Embodiments

In the second example of determination and the third example of determination, the permission time PT is set in consideration of a transition time. However, the permission time PT may be set based on an element other than time. For example, the permission time may be defined as the time period since the relevant number is determined to be out of the first predetermined number range in S12 until the detection result from one of the pressure sensors changes. Similarly, the permission time may be defined as the time period since the relevant number is determined to be out of the first predetermined pattern in S22 until the detection result from one of the pressure sensors changes.

The first to third examples of determination may also be combined. For example, the first and third examples of determination may be combined such that in the case where occurrence of abnormality is determined by the first example of determination, the determination is regarded as provisional and when occurrence of abnormality is further determined by the third example of determination, occurrence of abnormality is finally determined.

In the embodiment described above, an automatic transmission, which adopts a planetary gear mechanism, has been illustrated. However, the present disclosure is applicable to an automatic transmission as long as the automatic transmission achieves each of the change stages by a combination of engagement and release of the engagement mechanisms.

An aspect of the present disclosure provides an automatic transmission that achieves each of a plurality of shift stages by a combination of engagement and release of a plurality of engagement mechanisms, the automatic transmission including: a detection unit that detects an operating state of the engagement mechanisms; and a determination unit that determines whether or not abnormality has occurred, based on a result of detection performed by the detection unit. The determination unit determines that abnormality has occurred in the case where an operating state of the engagement mechanisms does not match a predetermined operating state.

With this configuration, determination as to abnormality may be made based on the result of detection performed by the detection unit without checking state variables such as the shift stage, the vehicle speed, and the input/output rotational speed at the present, thereby enabling improvement in the independence of abnormality detection.

In the present disclosure, the determination unit may determine that abnormality has occurred in the case where a number of engagement mechanisms that are in engaged state does not match a predetermined number.

With this configuration, determination as to abnormality may be made relatively easily, thereby enabling improvement in the independence of abnormality detection.

In the present disclosure, the determination unit may determine that abnormality has occurred in the case where a combination of the engagement mechanisms in engaged state and the engagement mechanisms in released state does not match a predetermined combination.

With this configuration, determination as to abnormality may be made relatively easily only based on the result of detection performed by the detection unit, thereby enabling improvement in the independence of abnormality detection.

In the present disclosure, the predetermined operating state may include: a first operating state of the shift stage in normal time, and a second operating state of the shift stage in transition time, and the determination unit may determine that abnormality has occurred in the case where one of following conditions is satisfied: a condition that the operating state of the engagement mechanisms does not match any one of the first operating state and the second operating state, and another condition that the operating state of the engagement mechanisms matches the second operating state, but later does not match the first operating state.

With this configuration, normal state and gear change transition state are distinguished, thereby enabling improvement in accuracy of determination.

In the present disclosure, the detection unit may include sensors, each of which is provided in a corresponding one of the engagement mechanisms, and the determination unit may determine whether or not abnormality has occurred in response to a change in a result of detection performed by one of the sensors.

With this configuration, occurrence of abnormality may be detected before an improper combination of engagement and release of the engagement mechanisms is made.

In the present disclosure, in the case where the determination unit determines that abnormality has occurred, a driving force inputted to an input shaft may not be transmitted to an axle.

With this configuration, occurrence of unexpected behavior of the vehicle may be avoided.

In the present disclosure, the automatic transmission may further include: an input shaft that rotates by a driving force from a driving source; and a plurality of planetary gear mechanisms that includes rotational element including a sun gear, a carrier, and a ring gear. The engagement mechanisms may be each a frictional engagement mechanism that operates by a hydraulic pressure of hydraulic fluid supplied by an electromagnetic valve, the frictional engagement mechanism may be capable of connecting between one of three pairs: the rotation element and the input shaft, the rotational element and the rotational element, and the rotational element and a casing, and the sensor may be a hydraulic pressure sensor that detects a hydraulic pressure supplied to the frictional engagement mechanism.

With this configuration, the independence of abnormality detection may be improved in common automatic transmissions using a hydraulic circuit and planetary gear mechanisms.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission that achieves each of a plurality of shift stages by a combination of engagement and release of a plurality of engagement mechanisms, the automatic transmission comprising:
    a detector that detects an operating state of the engagement mechanisms; and
    a control device that determines whether or not abnormality has occurred, based on a result of detection performed by the detector,
    wherein the control device determines that abnormality has occurred in a case where the operating state of the engagement mechanisms does not match a predetermined operating state such that the control device determines that abnormality has occurred when:
        a number of engagement mechanisms in an engaged state fails to match one of a plurality of predetermined numbers of engagement mechanisms in the engaged state, or
        a combination of the engagement mechanisms in the engaged state and the engagement mechanisms in a released state fails to match a predetermined combination of the engagement mechanisms in the engaged state and the engagement mechanisms in the released state, and
    wherein the control device does not use a vehicle speed for determining that abnormality has occurred.

2. The automatic transmission according to claim 1, wherein the control device determines that abnormality has occurred in a case where a combination of the engagement mechanisms in the engaged state and the engagement mechanisms in the released state does not match the predetermined combination.

3. The automatic transmission according to claim 1, wherein the control device determines that abnormality has occurred based on predetermined operating states including:
    a first operating state of the shift stage in normal time, and a second operating state of the shift stage in transition time, and the control device determines that abnormality has occurred in a case where one of following conditions is satisfied:

a condition that the operating state of the engagement mechanisms does not match any one of the first operating state and the second operating state, and another condition that the operating state of the engagement mechanisms matches the second operating state, but later does not match the first operating state.

4. The automatic transmission according to claim 1, wherein the detector includes sensors, each of which is provided in a corresponding one of the engagement mechanisms, and the control device determines whether or not abnormality has occurred in response to a change in a result of detection performed by one of the sensors.

5. The automatic transmission according to claim 4, further comprising:

an input shaft that rotates by a driving force from a driving source; and a plurality of planetary gear mechanisms that includes rotational elements including a sun gear, a carrier, and a ring gear, wherein the engagement mechanisms are each a frictional engagement mechanism that operates by a hydraulic pressure of hydraulic fluid supplied by an electromagnetic valve, the frictional engagement mechanism is capable of connecting between one of three pairs: one of the rotational elements and the input shaft, one of the rotational elements and another one of the rotational elements, and one of the rotational elements and a casing, and the sensor is a hydraulic pressure sensor that detects a hydraulic pressure supplied to the frictional engagement mechanism.

6. The automatic transmission according to claim 1, wherein in the case where the control device determines that abnormality has occurred, a driving force inputted to an input shaft is not transmitted to an axle.

7. The automatic transmission according to claim 1, wherein when the control device starts measuring time when the control device determines that:

the number of engagement mechanisms in the engaged state fails to match one of the plurality of predetermined numbers of engagement mechanisms in the engaged state, or the combination of the engagement mechanisms in the engaged state and the engagement mechanisms in the released state fails to match the predetermined combination of the engagement mechanisms in the engaged state and the engagement mechanisms in the released state, and wherein when the number of engagement mechanisms in the engaged state subsequently matches one of the plurality of predetermined numbers of engagement mechanisms in the engaged state within a predetermined time, or the combination of the engagement mechanisms in the engaged state and the engagement mechanisms in the released state subsequently matches the predetermined combination of the engagement mechanisms in the engaged state and the engagement mechanisms in the released state within the predetermined time, the control device determines that abnormality has not occurred.

8. The automatic transmission according to claim 1, wherein the control device determines that abnormality has occurred when the number of engagement mechanisms in the engaged state fails to match one of the plurality of predetermined numbers of engagement mechanisms in the engaged state, and wherein the plurality of predetermined numbers of engagement mechanisms in the engaged state includes each number of engagement mechanisms that are in the engaged state for each of the plurality of shift stages.

9. An automatic transmission comprising:

engagement mechanisms whose engagement states among the engagement mechanisms are changeable to achieve each of shift stages of the automatic transmission;

a detector configured to detect the engagement states of the engagement mechanisms; and a control device configured to determine that abnormality has occurred in a case where the engagement states detected by the detector do not match a predetermined engagement state such that the control device determines that abnormality has occurred when:

a number of engagement mechanisms in an engaged state fails to match one of a plurality of predetermined numbers of engagement mechanisms in the engaged state, or a combination of the engagement mechanisms in the engaged state and the engagement mechanisms in a released state fails to match a predetermined combination of the engagement mechanisms in the engaged state and the engagement mechanisms in the released state, and wherein the control device does not use a vehicle speed for determining that abnormality has occurred.

10. The automatic transmission according to claim 9, wherein the control device determines that the abnormality has occurred in a case where a combination of second engagement mechanisms among the engagement mechanisms that are in engaged state and third engagement mechanisms among the engagement mechanisms that are in released state does not match the predetermined combination.

11. The automatic transmission according to claim 9, wherein the predetermined engagement state is one of a plurality of predetermined engagement states that includes:

a first engagement state of the shift stage in normal time, and a second engagement state of the shift stage in transition time, and the control device determines that the abnormality has occurred in a case where one of following conditions is satisfied:

a condition that the engagement states of the engagement mechanisms do not match any one of the first engagement state and the second engagement state, and another condition that the engagement states of the engagement mechanisms do not match the first engagement state after the engagement states of the engagement mechanisms match the second engagement state.

12. The automatic transmission according to claim 11, wherein the another condition comprises a condition that the engagement states of the engagement mechanisms do not match the first engagement state after a lapse of a certain time in a case where the engagement states of the engagement mechanisms match the second engagement state.

13. The automatic transmission according to claim 9,
wherein the detector includes sensors, each of which is provided in each of the engagement mechanisms, respectively, and
the control device determines whether or not the abnormality has occurred in response to a change in a result of detection performed by one of the sensors.

14. The automatic transmission according to claim 13, further comprising:
an input shaft being to be rotated by a driving force from a driving source; and
planetary gear mechanisms including rotational elements including a sun gear, a carrier, and a ring gear,
wherein the engagement mechanisms each comprise a frictional engagement mechanism that is operated by a hydraulic pressure of hydraulic fluid supplied by an electromagnetic valve,
the frictional engagement mechanism is capable of connecting between one of three pairs: one of the rotational elements and the input shaft, one of the rotational elements and another one of the rotational elements, and one of the rotational elements and a casing, and
the sensors are hydraulic pressure sensors that detect a hydraulic pressure supplied to the frictional engagement mechanism.

15. The automatic transmission according to claim 9,
wherein in a case where the control device determines that the abnormality has occurred, a driving force inputted to an input shaft is not transmitted to an axle.

16. The automatic transmission according to claim 9,
wherein in a case where the control device determines that the abnormality has occurred, all of the engagement mechanisms are released.

17. An automatic transmission comprising:
engagement mechanisms whose engagement states among the engagement mechanisms are changeable to achieve each of shift stages of the automatic transmission;
detecting means for detecting the engagement states of the engagement mechanisms; and
determination means for determining that abnormality has occurred in a case where the engagement states detected by the detecting means do not match a predetermined engagement state such that the determination means determines that abnormality has occurred when:
a number of engagement mechanisms in an engaged state fails to match one of a plurality of predetermined numbers of engagement mechanisms in the engaged state, or
a combination of the engagement mechanisms in the engaged state and the engagement mechanisms in a released state fails to match a predetermined combination of the engagement mechanisms in the engaged state and the engagement mechanisms in the released state, and
wherein the control device does not use a vehicle speed for determining that abnormality has occurred.

* * * * *